US007290490B2

(12) United States Patent
Goldberg et al.

(10) Patent No.: US 7,290,490 B2
(45) Date of Patent: *Nov. 6, 2007

(54) WORK SURFACE DEVICE

(76) Inventors: Steven Lane Goldberg, P.O.Box 676030, Rancho Santa Fe, CA (US) 92067; Phillip Jay Berkovitz, 2859 Vista Acedera, Carlsbad, CA (US) 92009

( * ) Notice: Subject to any disclaimer, the term of this patent is extended or adjusted under 35 U.S.C. 154(b) by 0 days.

This patent is subject to a terminal disclaimer.

(21) Appl. No.: 11/460,390

(22) Filed: Jul. 27, 2006

(65) Prior Publication Data

US 2006/0254472 A1 Nov. 16, 2006

Related U.S. Application Data

(63) Continuation-in-part of application No. 10/768,246, filed on Jan. 30, 2004, which is a continuation of application No. 10/154,559, filed on May 23, 2002, now Pat. No. 6,745,702.

(51) Int. Cl.
*A47B 85/00* (2006.01)

(52) U.S. Cl. ............................. 108/26; 108/90; 108/24

(58) Field of Classification Search ............... 108/26, 108/115, 24, 25, 90; 248/188.9, 188.8; 297/188.08, 297/188.12, 217.1
See application file for complete search history.

(56) References Cited

U.S. PATENT DOCUMENTS 2,816,871 A * 12/1957 Fish ........................ 297/217.1
2,945,597 A * 7/1960 Romano ........................ 108/94
3,181,483 A * 5/1965 Devitt et al. .................. 108/25
3,659,369 A * 5/1972 Hermanson .................. 43/21.2
4,041,964 A * 8/1977 Shamoon ................ 134/115 R
4,106,811 A * 8/1978 Hernandez ............. 297/188.09
4,379,587 A    4/1983 Duncan
4,403,806 A * 9/1983 Stephen ................... 297/217.1
4,773,709 A * 9/1988 Slinkard ................ 297/188.09
4,810,031 A    3/1989 Patterson
4,846,076 A    7/1989 Menges, Sr. et al.
5,572,934 A * 11/1996 Aldridge et al. .............. 108/25
5,586,805 A * 12/1996 Rinehart ................ 297/188.09
5,592,884 A * 1/1997 Glick et al. ................... 108/25
5,865,124 A * 2/1999 Wroe .......................... 108/26

(Continued)

FOREIGN PATENT DOCUMENTS

FR          2 696 625 A1    4/1994

*Primary Examiner*—Jose V. Chen
(74) *Attorney, Agent, or Firm*—Stephen C. Beuerle; Procopio Cory Hargreaves & Savitch LLP (57) ABSTRACT

A work surface device has an upper member with a substantially planar top surface. A support is secured to the upper member for supporting the upper member on a support member with the planar top surface in a generally horizontal orientation. The support has a fastener or clamping device at its lower end for releasable engagement with a portion of the support member. A work board of shape and dimensions generally matching the shape and dimensions of the top surface may be placed on the top surface. The work board and upper member have aligned openings in which a receptacle may be seated or through which waste may be discarded into a container beneath the work surface. In one arrangement, the clamping device is secured to the upper rim of a container with the work surface spaced above the open upper end of the container.

23 Claims, 9 Drawing Sheets

U.S. PATENT DOCUMENTS 5,938,276 A     8/1999   Munoz et al.
6,148,737 A *  11/2000   Bowman et al. .............. 108/42
6,321,662 B1 * 11/2001   Fraise ......................... 108/25
6,745,702 B2 *  6/2004   Goldberg et al. ............. 108/26

* cited by examiner

WORK SURFACE DEVICE

RELATED APPLICATIONS

The present application is a continuation-in-part of co-pending U.S. patent application Ser. No. 10/768,246 filed on Jan. 30, 2004 which is incorporated herein by reference in its entirety, which is a continuation of U.S. Pat. No. 6,745,702 issued on Jun. 8, 2004, which is also incorporated herein by reference in its entirety.

BACKGROUND

1. Field of the Invention

The present invention relates generally to work surfaces for use in many work and home environments.

2. Related Art

There is often a shortage of work surfaces for performing various tasks in many work or home environments. For example, in a home or restaurant kitchen, work surfaces are needed for food preparation such as cutting up vegetables, preparing fish or meat, chopping various foods, and the like. Work surfaces are also needed for gardening, flower arranging both by a commercial florist and in the home, decorating, automobile maintenance, and the like. Work surfaces and cutting board devices are known for use in various fields, but these devices often do not increase the available work surface area, since they are often placed on top of a kitchen counter or other work table.

In our prior U.S. Pat. No. 6,745,702, a receptacle cover device for providing a raised work surface is described. The device may be secured over a receptacle such as a trash can, and has a work surface with an opening through which waste is dropped into the receptacle. Alternatively, a container or bowl for receiving chopped food or the like may be placed in the opening.

SUMMARY

It is an object of the present invention to provide a new work surface device.

According to one embodiment of the present invention, a work surface device is provided which comprises an upper member having a substantially planar top surface and a lower surface, a support on the lower surface for supporting the upper member on a support member with the planar top surface in a generally horizontal orientation, the upper member having an opening, and a work board of shape and dimensions generally matching the shape and dimensions of said top surface for removably placing on the top surface, the work board having an opening positioned for alignment with the opening in the top surface when the work board is placed on the top surface.

In one embodiment, the upper member has a raised rim surrounding the top surface and the work board is designed to be placed on the top surface within the raised rim, which will hold the work board in position. The support comprises one or more legs for supporting the upper member in a raised position above a support member. The support member is a counter top, table, floor, container or the like. In one embodiment, the support comprises a pair of legs having attachment devices at their lower ends for securing to the rim of a container with the opening positioned over an open top of the container.

In an application where the container is a trash container, items are discarded after working on the top surface or work board by simply dropping the items through the opening or openings into the trash container. The container is a cooler, storage container, cooking pan, fishing pail, bucket, or the like. In another embodiment, a bowl is seated in the opening and items prepared on the top surface, such as cut foods, are placed into the bowl for cooking, mixing, storage, or the like.

According to another embodiment of the present invention, a work surface device is provided which comprises an upper member having a substantially planar top surface and a pair of legs depending from the upper member for securing the upper member to a support such that the upper member is raised above the support. Each leg has a gripping device at its lower end for releasably securing the leg to a location on the support.

In one embodiment, the work surface device is designed to be attached to the upper rim of a container, bin, bucket or the like. In this embodiment, the gripping devices are locking screws, jaws or clamp devices which have a first part for engaging on the inside of a container rim and a second, adjustable part for engaging the outside of the container rim so that the rim is gripped between the two parts of the clamp or jaw device. The parts are spring loaded into engagement with the container rim, or the adjustable part is otherwise movable into engagement with the rim.

In another embodiment, the legs are adjustable or fixed in length and are designed to engage the ground in some cases, so that the work surface is used as a stand-alone work table. The upper member includes an opening to allow items to be dropped through the opening into a container on which the device is mounted. The container is a trash receptacle or bin for receiving any trash items from the work surface, such as vegetable peelings or cuttings to be discarded, or other work debris to be discarded, or is a container for receiving items after processing on the work surface, such as fish which have been cleaned and gutted, prepared vegetables, and the like. It will be understood that the use of the work surface device is not limited to cooking or food preparation. The work surface device is used in any area where a flat work surface is needed, such as gardening, floral arrangement preparation, automobile maintenance, offices, and the like.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for a work surface device and a method of deploying and using a work surface device. For example, one method as disclosed herein allows for placing the device on a container or other support with the work surface spaced above the container or support.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Unless otherwise stated, all technical terms used herein have the same meaning as commonly understood by one of ordinary skill in the art to which this invention belongs. Generally, the nomenclature used herein is that well known and commonly employed in the art. All publications, including patent documents and articles, referred to in this application are incorporated by reference in their entirety for all purposes to the same extent as if each individual publication were individually incorporated by reference. All headings are for the convenience of the reader and should not be used to limit the meaning of the text that follows the heading, unless so specified.

Referring to FIGS. 1–12, where like numerals indicate like and corresponding elements, a work surface device 10 is provided for use in offices, workshops, kitchens, and the like. One aspect of the present invention is a table-like work surface device suitable for supporting objects above a waste container 80 while providing access to the interior of the waste container 80 for facilitating disposal of waste within the waste container 80 without disturbing the supported objects. The work surface device 10 comprises a main body 20 having a substantially planar top comprising an upper manipulating surface 30 and a lower support surface 40, said main body 20 adapted for generally horizontal positioning; and at least one leg 50 having a first end 51 and a second end 52, said first end 51 fixably attached to and extending from said lower support surface 40 of said main body 20 for supporting said upper manipulating surface 30 above the waste container 80. The work surface device 10 and it's components is made of a variety of materials, including, for example, plastic such as injection molded polypropylene, rubber, metal, wood and glass.

In additional aspects of the present invention 10, the upper manipulating surface 30 has a plurality of apertures 73 formed therein to provide a means through which the user's fingers is inserted from below so as to levitate trays 81 and 82, cutting board 83 or other objects resting on the planar top of the main body 20 so as to facilitate easy removal from the planar top of the main body 20.

In additional aspects of the present invention 10, the legs 50 are integral with the lower support surface 40. In certain aspects of the present invention, the legs 50 are pivotally connected to the lower support surface by a hinging means 60. In some aspects of the present invention, the hinging means 60 is a living hinge. Living hinges are thin sections of plastic that connect two segments of a part to keep them together and allow the part to be opened and closed. Typically living hinges are used in containers that are used in high volume applications such as toolboxes, fish tackle boxes, CD boxes etc. The materials used to make the living hinge are very flexible plastics such as polypropylene and polyethylene. The hinging means makes it possible to open the legs 50 for use of the device and to close the legs 50 for storage, by folding the legs 50 generally flat against the lower support surface 40. In certain aspects of the present invention, the legs 50 further comprise a locking means, such as those disclosed in U.S. Pat. No. 4,765,619 or U.S. Pat. No. 4,838,180, for holding said legs 50 at an angle such that the work surface device 50 is placed on receptacles 80 of various shapes and sizes. In certain aspects of the present invention 10, the legs 50 are adjustable in length. In additional aspects of the present invention 10, the legs 50 are telescopingly adjustable and optionally fixable at predetermined distances, similar to those disclosed in U.S. Pat. No. 6,095,607.

Figure 1:
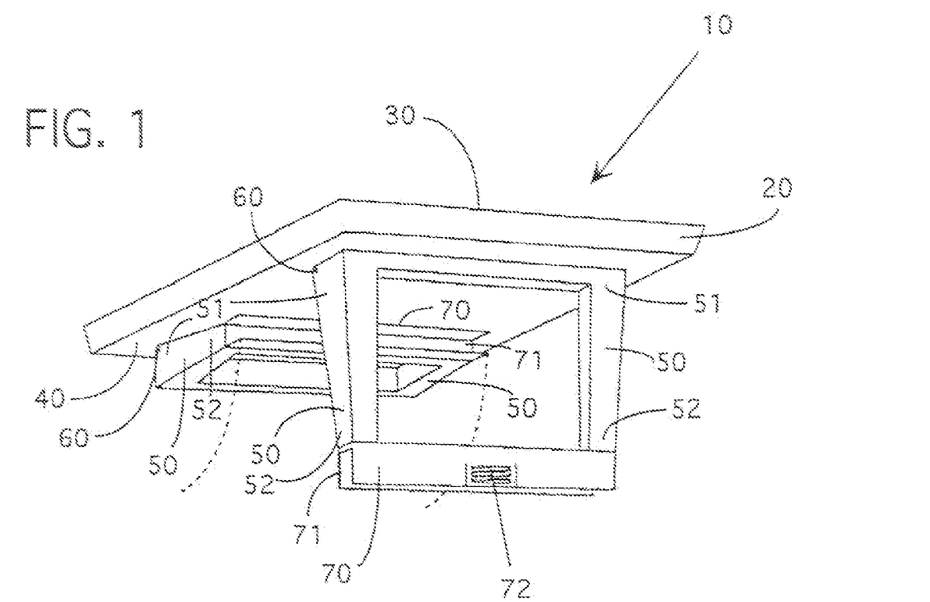
FIG. 1 is a perspective view of a work surface device of a first embodiment of the invention, with one pair of legs in an open position and the other pair of legs in a closed position.
Figure 2:
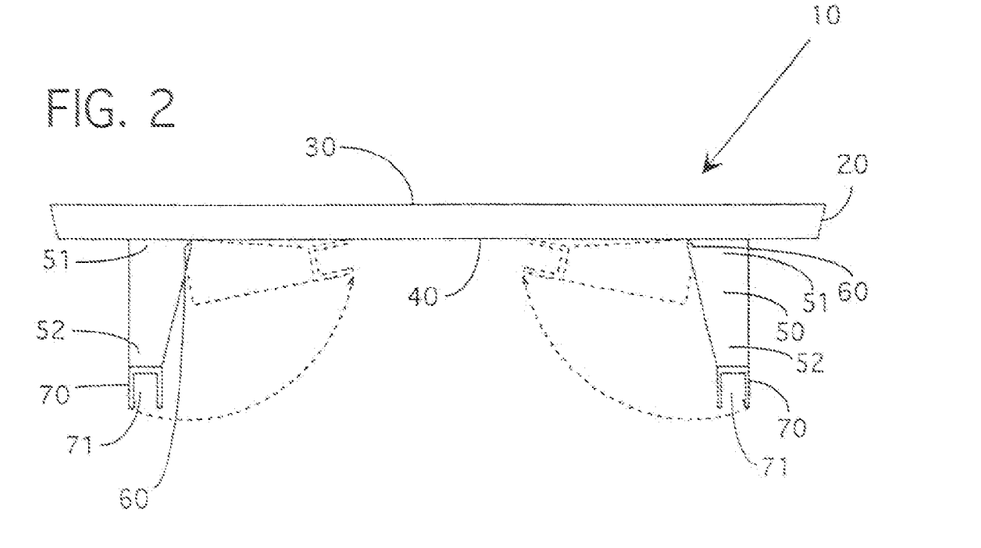
FIG. 2 is a side view of the work surface device of FIG. 1, illustrating the opening and closing of the legs.
Figure 3:
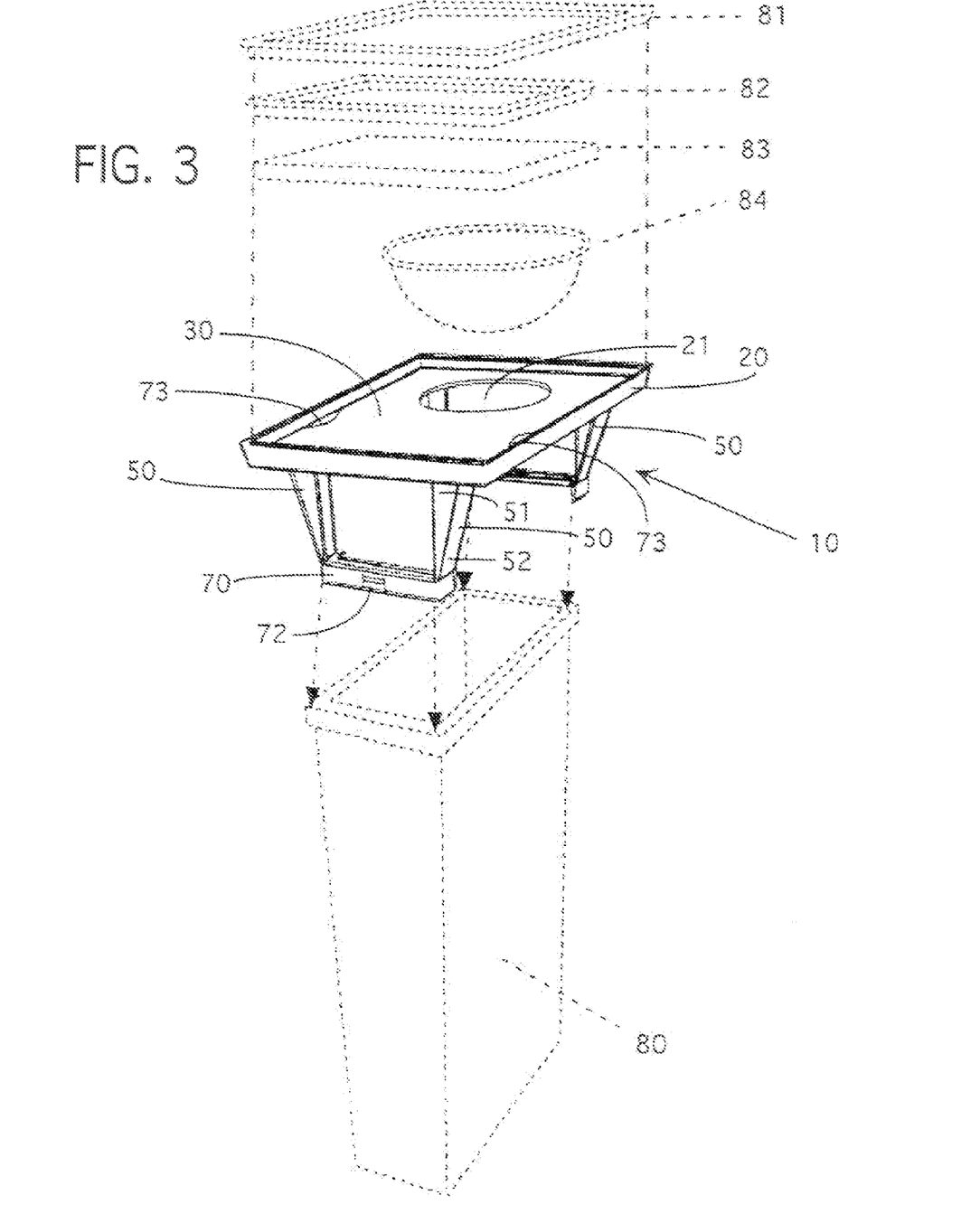
FIG. 3 is an open perspective view of the work surface device of FIG. 1, illustrating how the device attaches to the top of a rectangular receptacle and the accessory items that may be used with the device.
Figure 4:
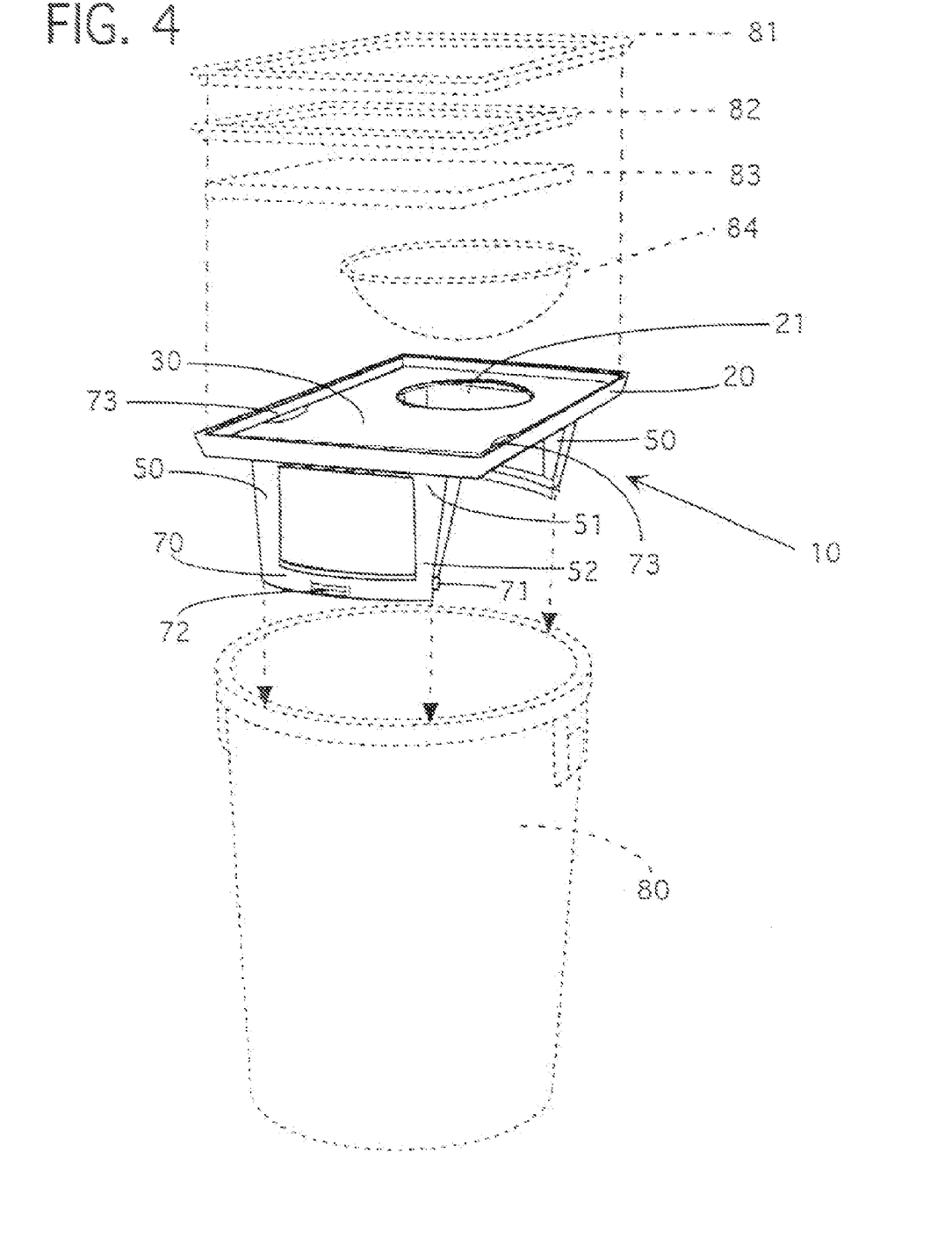
FIG. 4 is an open perspective view of a modified work surface device, illustrating how the device attaches to the top of a circular receptacle and the accessory items that may be used with the device.
Figure 5:
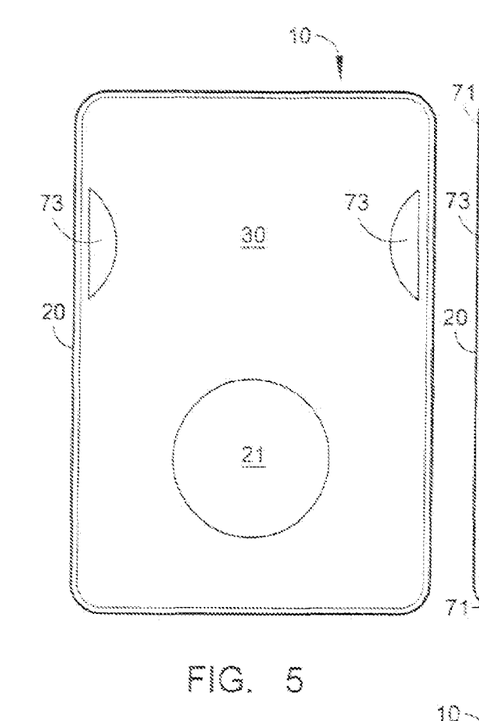
FIG. 5 is a top view of the modified work surface device of FIG. 4 showing the orifice.
Figure 6:
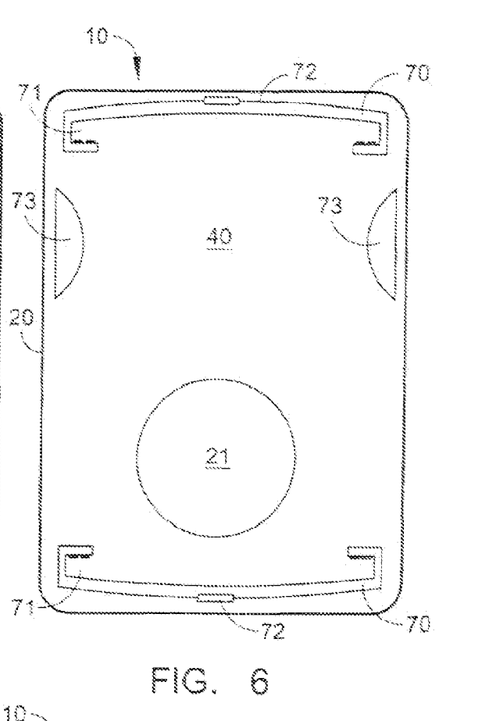
FIG. 6 is a bottom view of the work surface device of FIG. 4 showing braces designed to fit on a rounded receptacle.
Figure 7:
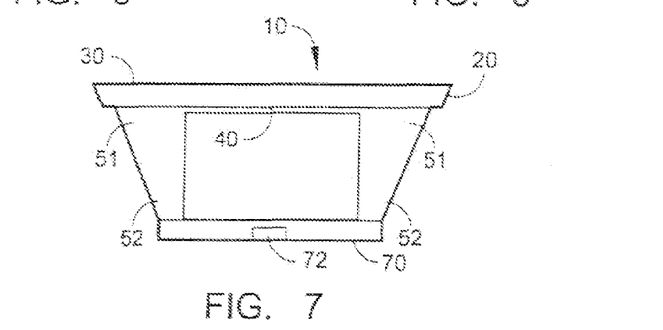
FIG. 7 is an end view of the work surface device of FIG. 4 showing braces designed to fit on a rounded receptacle.
Figure 8:
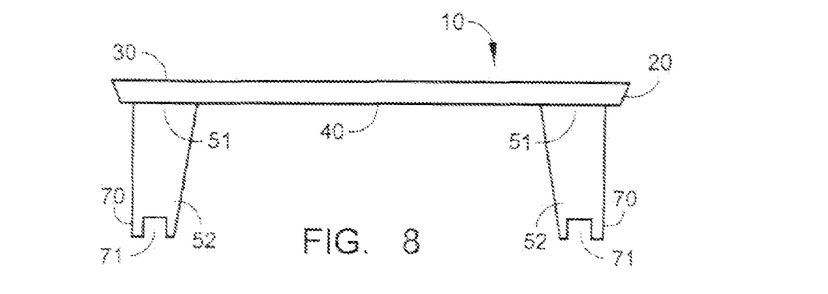
FIG. 8 is a side view of the work surface device of FIG. 4 showing braces designed to fit on a rounded receptacle.
Figure 9:
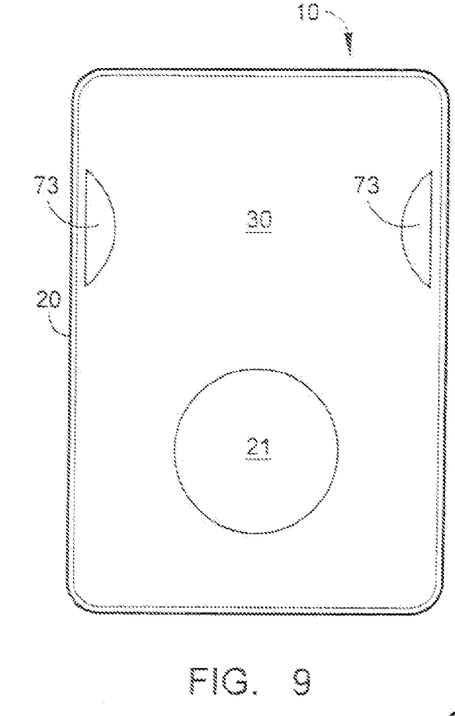
FIG. 9 is a top view of the work surface device of FIG. 1 showing the orifice.
Figure 10:
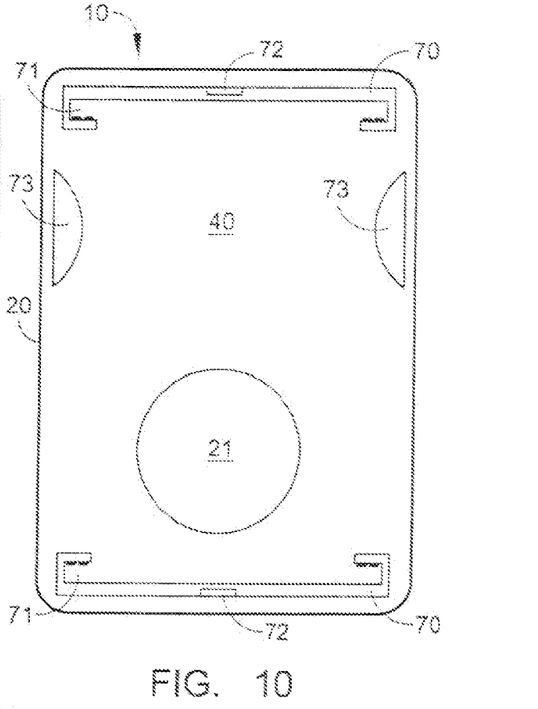
FIG. 10 is a bottom view of the work surface device of FIG. 1 showing braces designed to fit on a rectangular receptacle.
Figure 11:
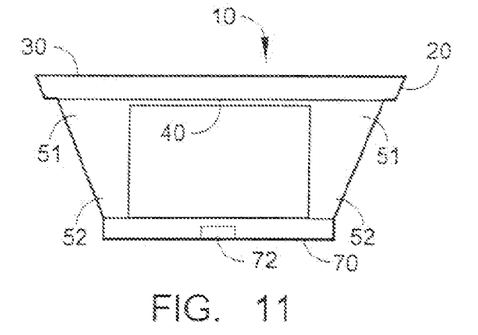
FIG. 11 is an end view of the work surface device of FIG. 1 showing braces designed to fit on a rectangular receptacle.
Figure 12:
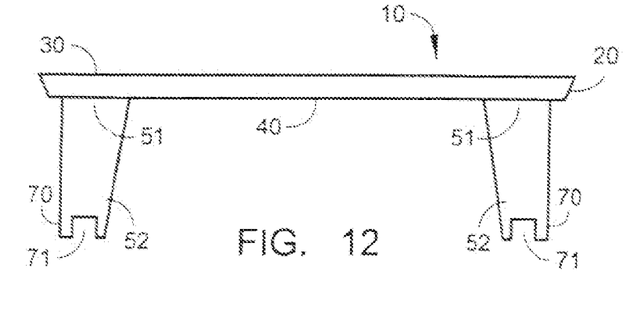
FIG. 12 is a side view of the work surface device of FIG. 1 showing braces designed to fit on a rectangular receptacle.

In another version of the present invention 10, a brace 70 is supportingly attached to two or more legs 50. The more than one brace 70 may be arrayed between two or more legs 50 from the first ends 51 of the legs 50 to the second ends 52 of the legs 50. Additionally, a single brace may be attached between two or more legs 50 at corresponding points at any distance from the lower support surface 40 between the first ends 51 and second ends 52 or at the second ends 52 of the two or more legs 50. In additional aspects of the present invention 10, the brace 70 further comprising a groove 71, facing away from the top of the device as shown in FIG. 1 and FIG. 2, for frictionally fitting said work surface device 10 onto the lip of the waste container 80. Alternatively, the present invention is placed on a counter top. In certain aspects of the present invention, the leg 50 further comprises a rubber-like foot or patted structure fixably attached to said second end 52 of said at least one leg 50. The brace 70 is generally curved or generally straight so that the device 10 can fit onto various shapes of waste receptacles 80, as indicated in FIG. 3 and FIG. 4. In further aspects of the present invention 10, the brace 70 also comprises a gripping region 72, by which the operator grasps the brace 70.

In certain additional aspects of the present invention 10, said planar top 20 has an aperture 21 formed therein for open-ended communication with the waste container 80 below as shown in FIG. 5, FIG. 6, FIG. 9 and FIG. 10. The aperture 21 may be of various shapes, such as circular, oval or rectangle. The aperture 21 may be of various sizes suitable for inserting and supporting commonly used utensils and containers. The aperture 21 may also be located in various places generally in the center of the top or generally near the edge of the top. Optionally, the planar top of the main body 20 is removably attached to said main body 20, providing a frame-like support structure with legs 50 that is used to support trays 81 and 82, cutting boards 83, and the like. In one embodiment, various accessories may be provided for optimally using with top 20, such as at least one full-length removable tray 81, at least one partial-length removable tray 82, at least one removable cutting board 83, at least one removable receptacle or container 84, or at least one removable sieving means 84. The removable trays 81 and 82, cutting board 83, container 84 and sieving means 84 may be made of commonly used materials, such as, for example, metal, plastic, glass and wood. The removable container may be of various common shapes, such as shallow and deep round bowls or shallow or deep oval bowls. The sieving 84 means may be of various shapes and designed to sieve or filter various materials. For example, the sieving means 84 might be a colander or grater, a chinoise or a cone filter.

In other aspects of the present invention 10, the main body 20 further comprises a plurality of panels movably attached in a flap-like manner to said main body 20 to cover the space defined by the manipulating surface 30, the at least one leg 50 and the waste container 80 while still permitting the disposal of waste into the waste container 80.

Another aspect of the present invention is a method of use of the work surface device 10 comprising the act of: placing said work surface device 10 on a receptacle 80.

A further aspect of the present invention is a method of holding objects above a receptacle 80 while facilitating disposal of waste into the receptacle 80 without disturbing the objects held above the receptacle 80, comprising: attaching a support structure 10 to the receptacle 80; placing objects on said support structure 10; and disposing of waste in the receptacle 80.

The present invention may be made using a variety of methods commonly used in the art. For example, if the present invention is made of plastic, the methods of plastic manufacturing available include, but are not limited to, injection molding, casting, laminating, extrusion and calendering. For example, the methods disclosed in U.S. Pat. Nos. 6,129,960, 4,548,773, or 5,451,363 might be used. Other methods may also be used. In addition, the present invention may be made of wood, metal, or glass, or a combination of plastic, wood, metal or glass.

There are many methods of manufacturing that may be used to manufacture the work surface device. For example, the device may be injection molded of plastic such as polypropylene or the like. In one example, molds of the device are made. Then thermoplastic resins are heated until they form a thick liquid. The melted resins are injected into the mold. The heat and pressure are applied to the mold, which causes the injected melted resin to harden. After the hardening process, the device is removed from the mold and is now ready or use.

To use the work surface device of FIGS. 1 to 3, the operator removes the device from the place where the device has been stored. If the device was just purchased, the device is removed from its packaging. With one hand the operator holds the device by the edge of the planar top. With the other hand, the operator grasps one leg near its second end and pulls the leg, pivoting the leg down and away from the lower support surface of the planar top of the device, until one leg is in the open position (FIG. 2). The remaining legs are opened from the flat, closed position to the open position, as described for the first leg. With the legs of the device open, as in FIG. 2, the device is placed on top of an open receptacle. To do this, the second ends of the legs are attached to the lip of the receptacle. The device may then be used to work or to hold objects. To clean and store the present invention the operator disengages the device from the top of the open receptacle, grasps each leg sequentially near its second end and pull the legs, pivoting the leg up and into the lower support surface of the planar top of the device. With both legs in an upright position, the device is cleaned by a common dish washing machine and then easily stored in a stacked position on a shelf.

FIGS. 13 to 17 illustrate a work surface device 100 according to another embodiment of the invention. Device 100 comprises an upper member having a substantially flat upper surface or work surface 110 and a pair of supports or legs 115,116 depending downwardly from opposite ends of the upper member. In one embodiment, the legs 115,116 are pivotally secured to the lower surface of the upper member by a hinge mechanism or the like, so that they are folded inwardly from the open or deployed position of FIG. 13 to the folded or storage position of FIG. 15 where they are stored flat against the lower surface of the upper member. As in the previous embodiment, any suitable hinge mechanism is used to pivotally secure the legs to the upper member, such as a so-called living hinge.

Figure 13:
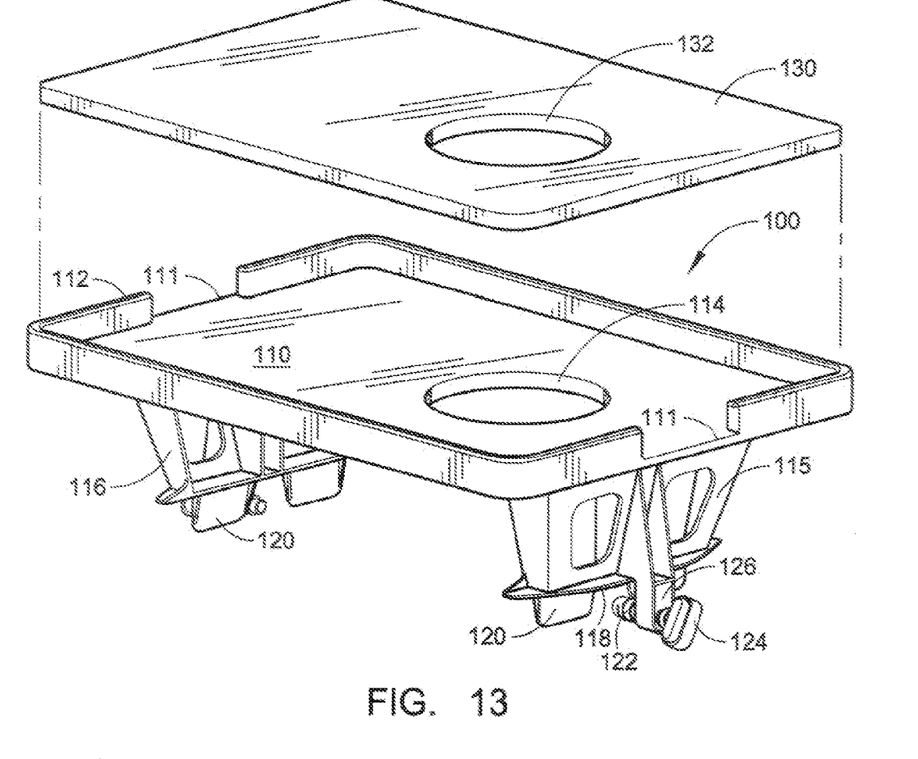
FIG. 13 is a perspective view of a work surface device according to another embodiment of the invention with the legs in an open position and illustrating a work board positioned above the work surface for optional placing on top of the work surface.

The work surface 110 has a opening 114 adjacent one end. It will be understood that in alternative embodiments the opening is of a different shape and different dimensions, and/or is located at a different position on the work surface. In further embodiments, additional openings are provided. In one embodiment, a raised peripheral rim 112 surrounds the work surface and has a pair of cut outs 111 at each end of the work surface. A separate, removable cutting/work (hereinafter "work") board 130 is provided for placing on top of the work surface 110 within the peripheral rim 112, the work board 130 having an opening 132 which is aligned or coincident with opening 114 when the board is positioned on top of the work surface 110. The cut outs 111 in rim 112 allow the board to be lifted up and away from the work surface when no longer needed. In the embodiment shown, the thickness of board 130 is substantially equal to the height of rim 112, so that the top surface of board 130 is substantially aligned with the top of rim 112 when positioned over the work surface. The work board 130 includes a second, separate, removable work surface from the work surface 110. Because the work board 130 is removable from the rest of the work surface device 100, the work board 130 is easily cleaned (e.g., in a dishwasher, by hand).

The work surface device 100 and work board 130 are made of any suitable materials, such as plastic, rubber, metal, wood, glass and the like, and the work surface device and work board are of the same or different materials. As in the previous embodiments, the work surface device 100 may be of injection molded plastic material, such as polypropylene or the like. The work surface device 100 and the work board 130 are preferably made of a dishwasher-safe material. Although the work surface 100 and work board 130 are rectangular in the illustrated embodiments, it will be understood that they are of different shapes in other embodiments, such as round, oval, or the like.

Figure 14:
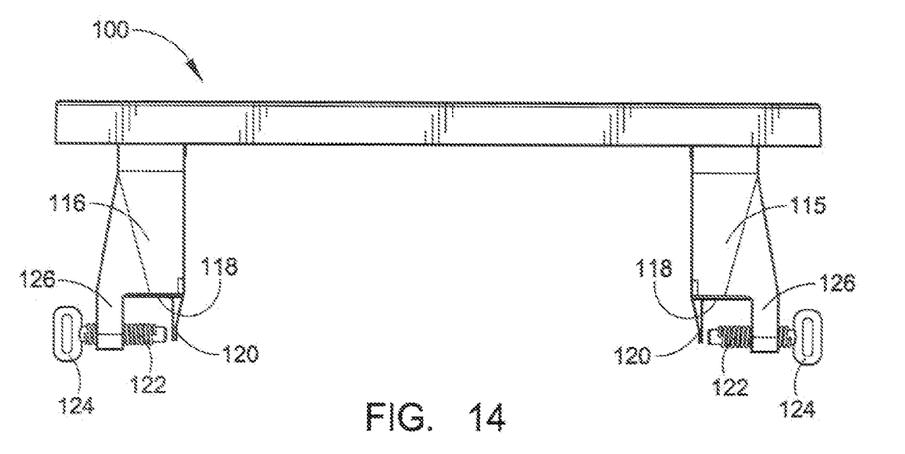
FIG. 14 is an end elevation view of the work surface device of FIG. 13.
Figure 15:
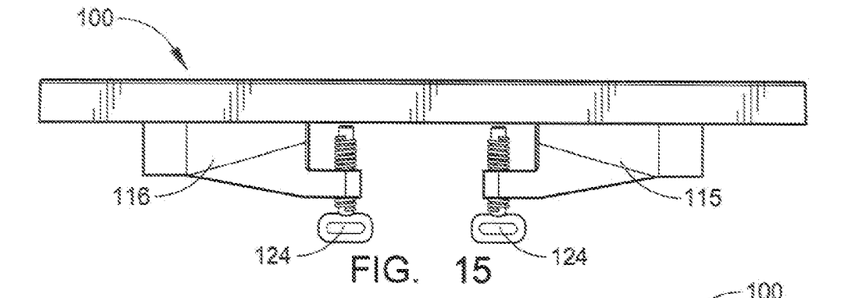
FIG. 15 is a side elevation view of the work surface device of FIGS. 13 and 14 showing the legs in a folded, storage position.

The legs 115,116 will now be described in more detail with reference to FIGS. 13 and 14. In one embodiment, each leg has an upper end secured by a hinge or the like to the lower surface of the upper member adjacent a respective end of the member, and has a web-like downwardly depending portion which extends across a major portion of the width of the upper member or work surface. A securing device is located at the lower end of each leg for releasably securing the leg to the rim of a container or the like, as will be described in more detail below with reference to FIGS. 14,16 and 17. In the illustrated embodiment, each securing device generally takes the form of a C-clamp or the like, as best seen in FIG. 14, but it will be understood that other securing devices, such as spring loaded securing devices, are alternatively used. In one embodiment, the dimensions of the legs are such that a clearance of at least 6 (six) and around 8 (eight) inches is provided between the container rim and the work surface or upper member 110.

In this embodiment, each clamp device is generally U or C shaped and faces downwardly (see FIG. 14). Each clamp device has a pair of inner fixed jaws or tongues 120 and a spaced outer arm 126 which project downwardly from a flat or generally horizontal flange or ledge 118 located adjacent the lower end of each leg. Each clamp device has an outer, movable jaw comprising the end of a locking screw 122 extending through a threaded opening in the outer arm 126 of the C-clamp. The movable jaw or screw 122 is centrally located in a space between the two fixed jaws or tongues 120, as best seen in FIG. 13. Screw 122 has an enlarged head 124 at its outer end for adjustment purposes. As best seen in FIG. 14, the end of each screw 122 is spaced a short distance outwardly from the support pads or tongues 120 when in an extended position. The head 124 is rotated in opposite directions in order to move the end of the screw inwardly or outwardly.

Figure 16:
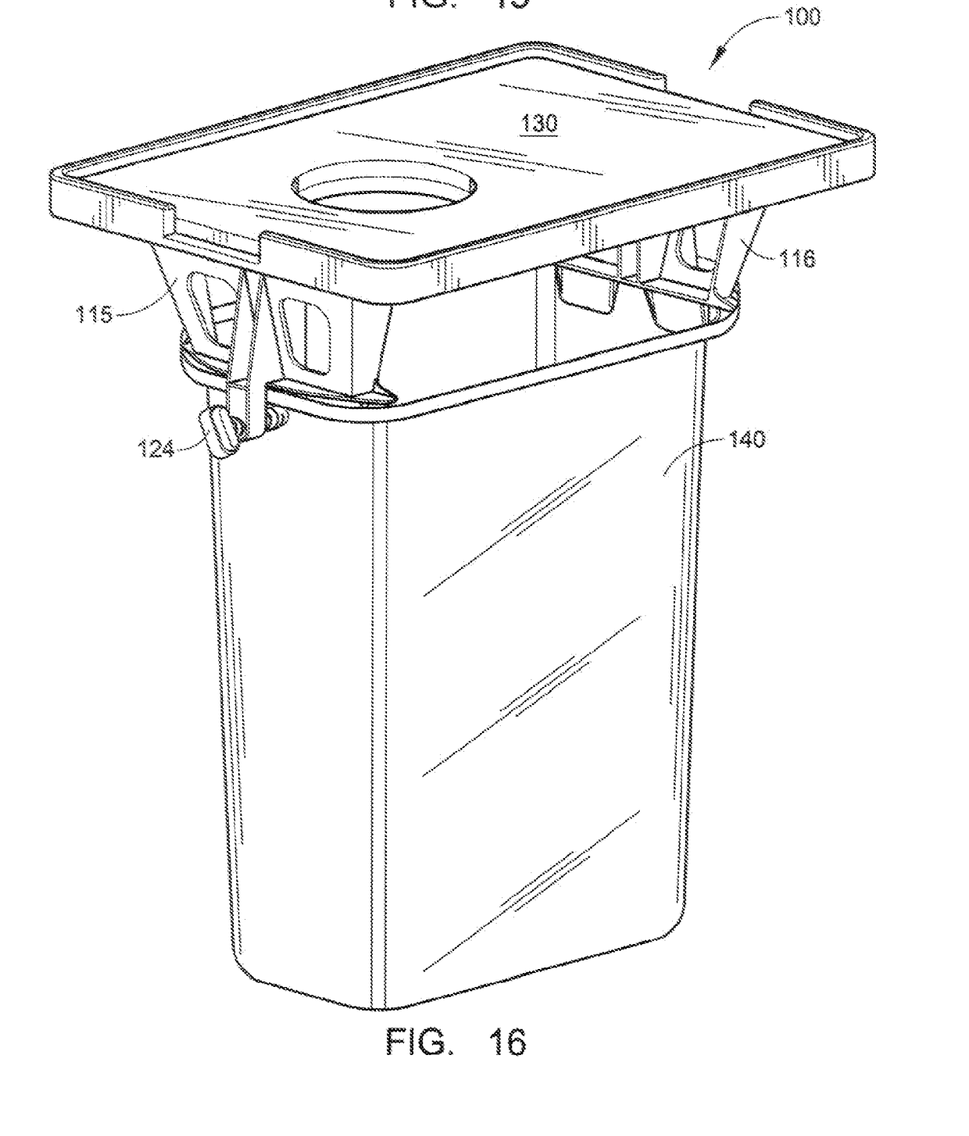
FIG. 16 is a perspective view illustrating the work surface device of FIGS. 13 to 15 secured to the upper rim of a rectangular container.
Figure 17:
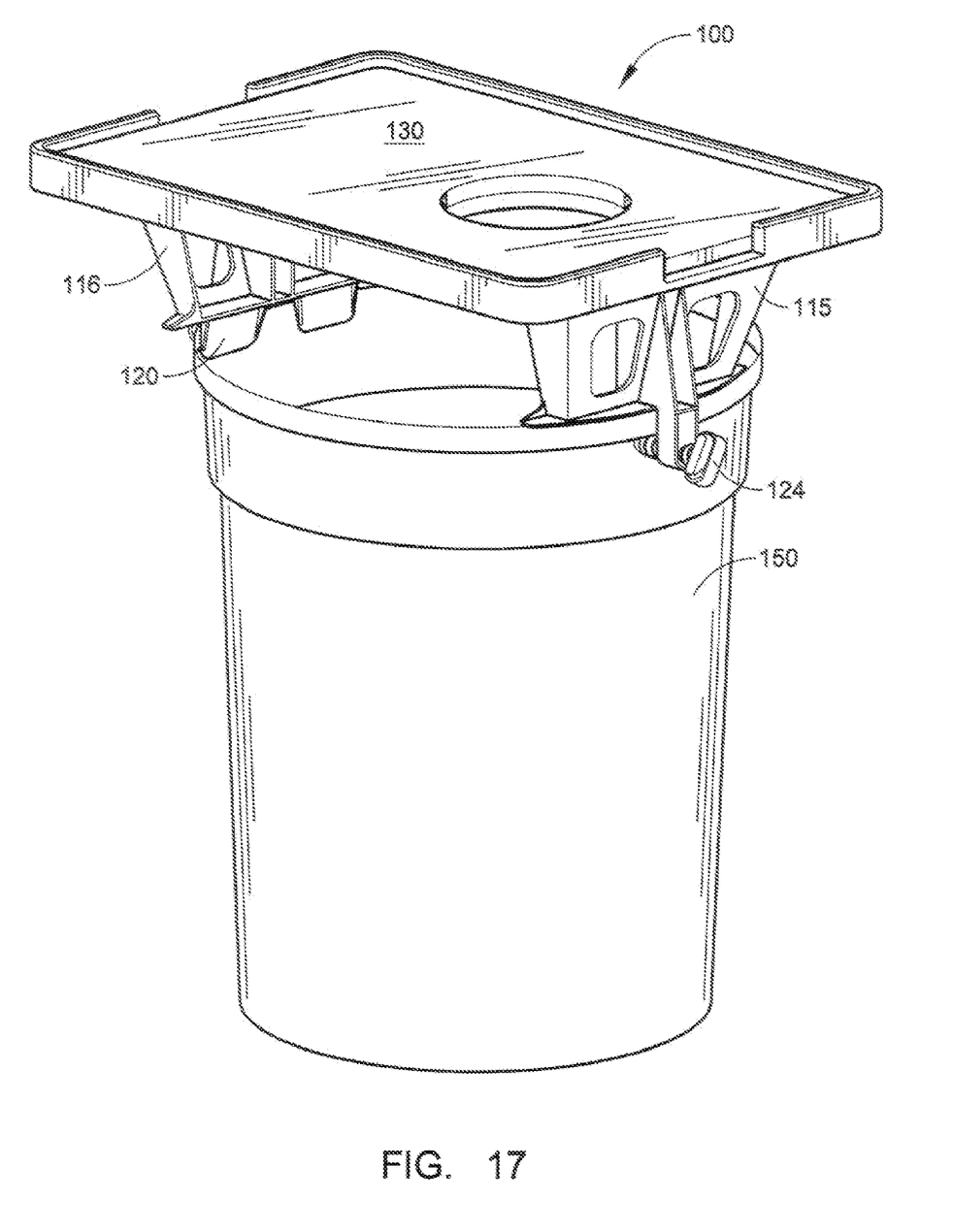
FIG. 17 is a perspective view illustrating the work surface device of FIGS. 13 to 15 secured to the upper rim of a round container.

The work surface device is positioned over the open top of any type of container if desired, such as the rectangular container 140 of FIG. 16 or the round container 150 of FIG. 17. In order to position the device 100 over a container, the legs 115,116 are first rotated outwardly from the storage position of FIG. 15 into the deployed position of FIG. 14. The two clamps are adjusted so that the ends of screws 122 are spaced outwardly from the opposing pads 120 to leave a relatively large gap between the jaws for maneuvering purposes. The device 100 is then lowered downwardly onto the upper rim of a container so that the flat flanges 118 rest on opposing portions of the upper rim with the pads 120 against the inner face of the container adjacent the upper rim and the adjustable locking screws 122 facing the outside wall of the container. The locking screws 122 are then tightened until the ends of the screws 122 contact and press against the outside wall, as indicated in FIG. 16. The upper rim is then gripped on each side between the pads 120 and the opposing end of screw 122 at the lower end of each leg. The upper surface or work surface 110 is spaced above the open top of the container, to provide access to the container via the gap between work surface 110 and the container or via the opening 140. Exactly the same technique is used to secure the legs 115,116 to opposite portions of the rim of a round container 150, as illustrated in FIG. 17.

Although the legs are positioned adjacent opposite ends of a rectangular work surface in the illustrated embodiment, it will be understood that they are positioned differently in alternative embodiments. They are secured anywhere on the lower surface of the upper member at an appropriate spacing for fitting on opposing portions of an upper rim of a container. The work surface device is provided in different sizes and leg spacings for fitting onto different size containers, and/or the spacing between the legs or fastener devices can be adjustable. In one embodiment, the work surface device is designed to fit 32 or 44 gallon round receptacles, or 17 or 23 gallon rectangular receptacles, as well as most bus tubs used in restaurant kitchens.

The work surface device 100 allows any container to be easily converted into a fully functional, stand-alone work table or food or drink serving table. In the latter case, the work surface may be covered by a table cloth or the like, or a food serving tray may be placed on top of work surface 110. The container is a trash bin or waste receptacle in one embodiment, but alternatively is any suitable container such as a cooler, storage bin, bucket, fishing supply container, bus tub, or the like. Where the container is a trash receptacle, debris resulting from work done on the work surface 110 or work board 130 is easily swept into the trash receptacle through opening 114, or aligned openings 132, 114 when the work board is in use. Alternatively, the container is for collecting various items after manipulation on the work surface, such as vegetables after cleaning, cutting and/or peeling, fish after gutting and cleaning, or the like.

As noted above, openings 132, 114 are of any desired size and shape, and, in alternative embodiments, are used to receive a smaller container or device to be seated in the opening, such as the bowl or round colander or sieve 84 of FIG. 3. A bowl-like container is used to collect cut vegetables or other items after processing on the work surface is complete. A sieve, chinoise, or the like placed in the opening is used to press excess moisture from prepared food items, with the released fluid captured in the container below.

The clamp devices on the legs 115, 116 allow the work surface device of FIGS. 13 to 17 to be fastened substantially rigidly to the rim of container, so that the top surface or work surface will be relatively stable while carrying out operations such as cleaning, cutting or chopping, or other manipulations for which a flat work surface is required.

Some examples of possible uses for the work surface device of any of the previous embodiments are explained below.

EXAMPLE 1

Restaurants often have busy, crowded kitchens, with little extra counter space. The present invention satisfies several needs. Prepared food items are placed on a sheet pan or in a container sitting on the present invention thus increasing valuable workspace in the kitchen. The dimensions of the work surface 110 are such that one full sheet pan, two half sheet pans, full or half cutting boards, or the custom cutting board of FIG. 13 may be placed on the work surface. In one embodiment, dimensions of work surface 110 are of the order of 19¼ inches by 27¼ inches. By placing pans or containers onto surface 110 rather than on a standard 6 in. by 30 in. prep table, 20% more work space can be provided.

In one example, a work board is placed on the apparatus and vegetables chopped and the waste swept through the aperture into the waste container below. Alternatively, a bowl is placed in the aperture and the chopped vegetables on the work board transferred from the work board into the bowl, and then the bowl is removed from the apparatus and transferred to another location in the kitchen, such as the stove. In another application, a chinoise is placed in the aperture, a mixture placed in the chinoise, and the fluid pressed through the chinoise into the waste container below. The material remaining in the chinoise can then be used in another cooking process. In a further operation, the present invention holds a tray and items such as glasses are placed on the tray and then moved to another location by lifting the tray. The first tray can then be replaced with a second tray to be filled. In still another operation, the present invention is used to hold boxes or the like while making the waste container available.

EXAMPLE 2

In offices and copy rooms, supplies are often stored in boxes in cabinets and shelves. However it is not uncommon for counter space to be taken up by supplies or another person's work. The present invention is placed conveniently by a commonly used piece of machinery, such as a photocopier. This provides a place to put down documents being copied or small office supplies such as paper clips, staple removers, tape dispensers, and the like, while facilitating disposal of waste without disrupting the work placed on the device.

EXAMPLE 3

In machine shops, there is often a need for a convenient waste container but there is limited space. In such an application, the present invention is placed next to each machinist's work space. While providing a convenient waste disposal container, the present invention also provides a convenient place for holding tools and things such as nuts, bolts and screws. In addition, it is common in machine shops to wash mechanical components in solvents. The present invention provides a support for cleaning the components as well as convenient waste disposal directly below the work surface.

Figure 18:
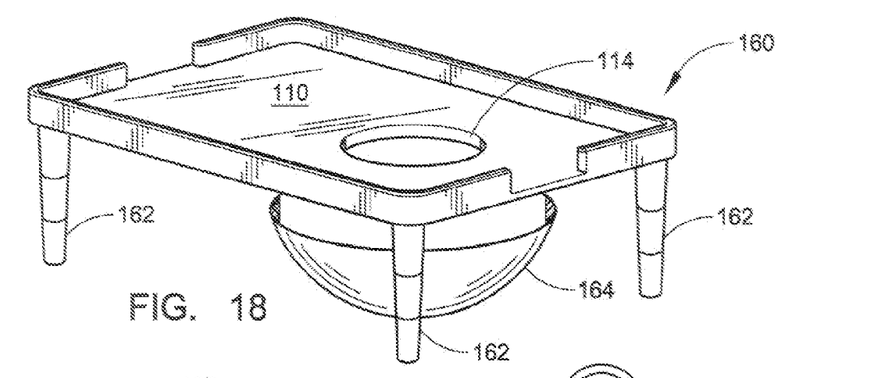
FIG. 18 is a perspective view of a stand-alone work surface device according to another embodiment of the invention.

Although the work surface device of the previous embodiments is intended to be secured to the rim of any type of container, it will be understood that the work surface device is supported by other means in alternative embodiments. In one embodiment, as illustrated in FIG. 18, the work surface device 160 is a stand-alone work table with extended legs 162 for engaging the ground and supporting the flat work surface 110 at a suitable height above the ground. In alternative embodiments, the legs are adjustable in length for use either as a stand-alone work table or for mounting on top of a container or the like. A container or waste bin 164 is placed under the opening 114 in work surface 110 for catching debris.

Figure 19:
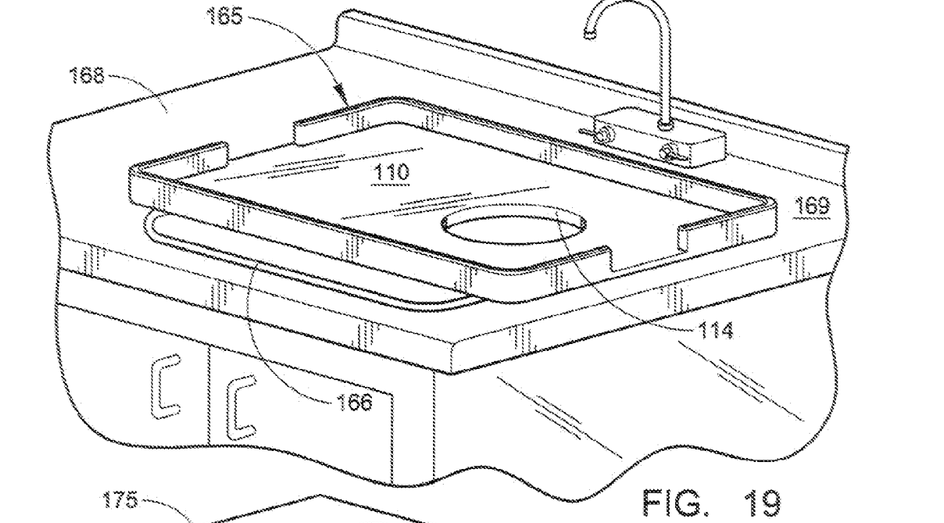
FIG. 19 is a perspective view of a modified work surface device according to another embodiment of the invention.

FIG. 19 illustrates a work surface device 165 according to another alternative embodiment. In this embodiment, the device has a work surface 110 identical to that of the previous embodiments but the legs of the previous embodiments are either completely eliminated or collapsible. The work surface 110 is placed flat over a sink 166, as indicated in FIG. 19, with opposite ends of the work surface resting on adjacent portions of the countertop 168,169 on opposite sides of the sink. The opening 114 is positioned over the sink and any debris on surface 110 is swept through the opening and into the sink, where it is disposed of in a waste disposal unit or the like. Alternatively, a bowl for catching prepared food is positioned in the sink below opening 114. Alternatively, the device 165 is placed flat on top of any other type of receptacle, such as a waste bin or the like.

Figure 20:
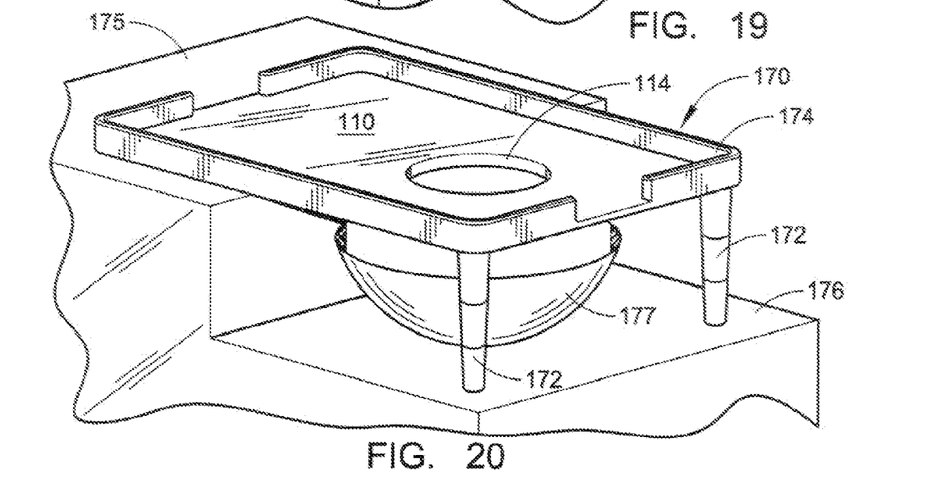
FIG. 20 is a perspective view of a work surface device according to another embodiment of the invention.

FIG. 20 illustrates a work surface device 170 according to another embodiment of the invention which comprises a generally flat work surface 110 as in the previous embodiments but with only one leg or pair of legs 172 at one end of the work surface. The other end or opposing portion 174 is supported at the edge of a counter top, shelf or the like, simply by resting it on top of the counter top, for example, or by securing a suitable clamping device on one leg to the edge of a table or counter top. FIG. 20 illustrates the end 174 of the work surface resting on top of the edge of a shelf 175 with leg 172 seated on an adjacent, lower shelf 176. A bowl, container, or other receptacle 177 is positioned below opening 114 for receiving items processed on work surface 110 or items to be discarded. This arrangement provides an extended work surface.

The work surface or prep table device as described above reduces or avoids the need to place sheet pans, cutting boards, or bowls directly on waste receptacles. The device is made of durable, heat resistant material which is dishwasher safe. The work table device may be used in food preparation or as a catering table for serving food or drinks, or for any other application where a handy work or display surface is desired.

The above description of the disclosed embodiments is provided to enable any person skilled in the art to make or use the invention. Various modifications to these embodiments will be readily apparent to those skilled in the art, and the generic principles described herein is applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A work surface device, comprising:
    an upper member having a substantially planar top surface and a lower surface;
    a support secured to the upper member for supporting the upper member on a support member with the planar top surface in a generally horizontal orientation;
    the upper member having a first opening; and
    a work board of shape and dimensions generally matching the shape and dimensions of said top surface for removably placing on said top surface, the work board having a second opening positioned for alignment with the first opening when the work board is placed on the top surface.

2. The device as claimed in claim 1, wherein the upper member has a raised rim surrounding the top surface and the work board is of predetermined shape and dimensions for placing on the top surface within the raised rim.

3. The device as claimed in claim 2, wherein the raised rim has at least two opposing cut outs configured to allow a user to engage the rim of a work board positioned on the top surface in order to lift the work board off the top surface.

4. The device as claimed in claim 1, wherein the support comprises at least one leg.

5. The device as claimed in claim 4, wherein the support comprises at least two spaced, downwardly depending legs.

6. The device as claimed in claim 5, wherein each leg has a securing device at its lower end configured to releasably secure the leg to the rim of a container.

7. The device as claimed in claim 6, wherein each securing device comprises a C-clamp.

8. The device as claimed in claim 5, wherein each leg is pivotally connected to the upper member for movement between a folded, storage position resting against the lower surface of the upper member and a deployed position depending downwardly from the upper member.

9. A work table assembly, comprising:
a container having a peripheral wall having an upper rim surrounding an upper opening of the container;
a work surface device configured for mounting over the upper opening of the container; and
the work surface device having an opening for disposing of waste on the work surface through the opening and into the underlying container and an upper member comprising a substantially flat, horizontal work surface and at least one support depending downwardly from the upper member, the support having a lower end and a securing device at the lower end of the support attached to the upper rim of the container;
whereby the upper member is spaced above the upper opening of the container.

10. The assembly as claimed in claim 9, further comprising a receptacle for fitting into the opening in the work surface.

11. The assembly as claimed in claim 9, further comprising a sieve for fitting into the opening in the work surface.

12. The assembly as claimed in claim 9, further comprising a work board for fitting onto the work surface, the work board having an opening for alignment with the opening in the work surface.

13. The assembly as claimed in claim 12, wherein the work surface has a raised peripheral rim for retaining the work board in position on the work surface.

14. The assembly as claimed in claim 9, wherein the container is a waste bin.

15. The assembly as claimed in claim 9, wherein the container is a storage container.

16. The assembly as claimed in claim 9, wherein the container is a cooler having insulating walls.

17. A work surface device, comprising:
a work surface member having a substantially planar top surface;
a support configured to support the work surface member on a support member with the planar top surface in a generally horizontal orientation;
the work surface member having a first opening; and
further comprising a work board of shape and dimensions generally matching the shape and dimensions of said top surface for removably placing on said top surface, the work board having a second opening positioned for alignment with the first opening when the work board is placed on the top surface.

18. The device as claimed in claim 17, wherein the support comprises at least two legs depending downwardly from the work surface member for supporting the planar top surface at a spacing above the support member.

19. The device as claimed in claim 18, wherein the legs are adjustable in length.

20. The device as claimed in claim 17, wherein the work surface member has opposite end portions, the support comprising at least one leg depending downwardly from one end portion of the work surface member for engagement with a first support surface, the opposite end portion being configured for resting on a second support surface spaced above the first support surface.

21. A method of supporting and using a work surface, comprising the steps of:
deploying at least one support to depend downwardly from an upper member having a generally flat, upper work surface;
securing the lower end of the support to the open rim of the container so that the upper member is spaced above an open, upper end of the container, the work surface is generally horizontal, and a gap is provided between the upper member and open upper end of the container through which items is placed in the container;
processing items on the work surface; and
placing a work board on the work surface with an opening in the work board aligned with the opening in the work surface.

22. The method as claimed in claim 21, further comprising cutting items on the work board, and disposing of waste created by the cutting step by dropping the waste through the aligned openings and into the container.

23. The method as claimed in claim 22, further comprising placing a receptacle in the aligned openings with a rim of the receptacle resting on the work board, cutting items on the work board, and sweeping the cut items into the receptacle.

* * * * *